United States Patent

Farstad

[11] 3,978,715
[45] Sept. 7, 1976

[54] LOW FREQUENCY, HIGH SENSITIVITY ELECTROMECHANICAL TRANSDUCER

[75] Inventor: Johan T. Farstad, Sunbury, Ohio

[73] Assignee: IRD Mechanalysis, Inc., Columbus, Ohio

[22] Filed: July 15, 1974

[21] Appl. No.: 488,694

[52] U.S. Cl. ................................ 73/71.2; 73/516 R
[51] Int. Cl.² ........................................ G01P 15/08
[58] Field of Search ................ 73/71.2, 71.4, 516 R, 73/517 R, 517 B

[56] References Cited
UNITED STATES PATENTS

| | | | |
|---|---|---|---|
| 2,332,994 | 10/1943 | Draper et al. | 73/71.2 |
| 2,671,202 | 3/1954 | Petroff | 73/71.2 X |
| 3,001,407 | 9/1961 | Wiancko et al. | 73/516 R X |
| 3,323,372 | 6/1967 | Kistler et al. | 73/517 B |
| 3,461,400 | 8/1969 | Koda | 73/517 B X |
| 3,520,196 | 7/1970 | Morris et al. | 73/516 LM |
| 3,618,402 | 11/1971 | Kase | 73/517 B |

*Primary Examiner*—James J. Gill
*Attorney, Agent, or Firm*—Harry B. Keck; George E. Manias

[57] ABSTRACT

An electromechanical transducer employs an Eddy current type displacement sensing device mounted in confronting relation to a seismically supported, nonmagnetic metal beam which is presented within an enclosed chamber. Movement of the nonmagnetic metal beam is damped. Movement of the nonmagnetic metal beam relative to the Eddy current type displacement sensing device occurs when the device is moving cyclically at low frequencies up to about 200 Hertz. Because of the damping of the movement of the metal beam, its instantaneous displacement is proportional to the instantaneous acceleration applied to the transducer. The output electrical signal from the Eddy current displacement sensing device can be integrated to provide an output signal directly proportional to the instantaneous velocity of the transducer. The signal can be twice integrated to provide an output signal corresponding to the instantaneous displacement of the transducer.

1 Claim, 6 Drawing Figures

LOW FREQUENCY, HIGH SENSITIVITY ELECTROMECHANICAL TRANSDUCER

BACKGROUND OF THE INVENTION

1. Field of the Invention

The present invention relates to a low frequency responsive electromechanical transducer, operable as an accelerometer, a velocity transducer or as a displacement transducer.

2. Description of the Prior Art

Seismically mounted motion sensors are available. See U.S. Pat. Nos. 2,754,435 and 3,157,852. Such devices normally operate over ranges which are well above the natural resonance frequency of their spring-mass system. Hence at low frequencies the seismic sensors lose sensitivity. Accelerometers are available for sensing motion at frequencies below the natural frequency of their spring-mass system.

There are numerous accelerometer devices available for measuring the instantaneous acceleration applied to a device when the accelerometer is exposed to high frequency cyclic movement. Where low frequency cyclic movement is encountered, there are available suitable devices for measuring the instantaneous acceleration. One type of low frequency device is a strain gauge, piezoresistive type, which has a shortcoming in that its sensitivity is poor, to wit, its sensitivity is in the range of 10 to 20 millivolts/g. Such devices can be made more sensitive but they become quite fragile. The other type of low frequency device is a servo accelerometer sometimes called a forced balance accelerometer or an inertial guidance accelerometer. This device has a high sensitivity and operates in the range of 0 to 15 Hertz. Its principal shortcoming is its high initial cost.

There exists a need in the art for a device which will accurately detect acceleration of cyclic movement at low frequencies with a high degree of sensitivity and which can be produced for a relatively modest cost.

Eddy current type displacement sensing devices are well known in the art as devices which can be used to measure the instantaneous displacement between themselves and a metallic target within their measuring zone. See U.S. Pat. Nos. 3,521,158; 3,521,159; 3,541,394; 3,707,671.

SUMMARY OF THE INVENTION

According to this invention, a low cost unit is provided which employs a seismically mounted spring-mass system which is damped to retard its movement. The movement of the damped spring-mass system is measured with a non-contacting Eddy current type displacement sensing device. The measured displacement of the damped spring-mass system corresponds to the instantaneous acceleration of the unit.

The unit includes an enclosed chamber filled with a liquid damping medium; a nonmagnetic metal beam is resiliently mounted within the damping medium in confrontation with the sensing portion of an Eddy current type displacement sensing device. As the device moves cyclically at relatively low frequencies, the nonmagnetic metallic beam will be displaced proportional to the instantaneous acceleration applied to the device. Thus when the Eddy current type displacement sensing device indicates the displacement of the nonmagnetic metallic beam, that indication is the same as an indication of the instantaneous acceleration applied to the device.

DESCRIPTION OF THE PREFERRED EMBODIMENT

Figure 1:
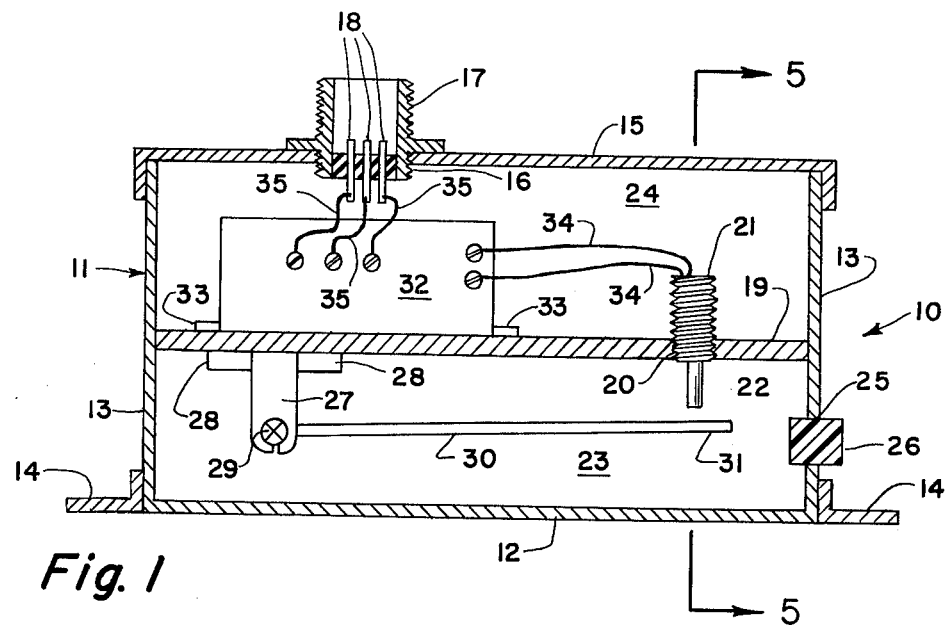
FIG. 1 is a schematic cross-section illustration of an accelerometer device according to the present invention.

As shown in FIG. 1 the present accelerometer 10 is formed from a cup-like member 11 having a flat circular base 12 and vertical side walls 13. A cap member 15 fits over the upper ends of the side walls 13. Mounting brackets 14 are secured to the cup-like member 11 near the base 12. A threaded bore 16 is provided for receiving a plug 17 having three terminals 18. Mounted across the container 11 as a separator membrane is a wall member 19 which is sealed at its edges to the inner surface of the side wall 13 and provided with a threaded opening 20 for receiving a threaded Eddy current sensing device 21 having a forward sensing probe 22. The wall member 19 divides the interior of the member 11 into a bottom chamber 23 and a top chamber 24. The bottom chamber 23 is adapted to be filled with a damping fluid such as a medium viscosity oil or silicone fluid. Preferably the chamber is filled in a vacuum housing to eliminate air bubbles from the chamber. A preferred damping fluid is a silicone oil of about 500 centistokes viscosity. An aperture 25 in the side wall 13 is provided to introduce the damping fluid. A suitable plug member 26 seals off the aperture 25 after the fluid has been introduced.

Figure 5:
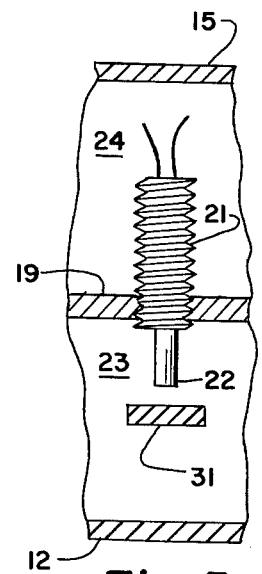
FIG. 5 is a cross-section illustration taken along the line 5—5 of FIG. 1.

Connected to the underside of the wall member 19 is a bracket 27 with mounting flanges 28 for supporting a torsion pivot 29 which will be more fully illustrated in connection with FIGS. 2, 3 and 4 hereinafter. Secured to the torsion pivot 29 is a nonmagnetic metallic beam 30 having a forward end 31 presented in confronting relation with the measuring probe 22 of the Eddy current sensing device 21 as better seen in FIG. 5.

Disposed within the upper chamber 24 is a signal conditioning device 32, secured to the barrier wall 19 by mounting flanges 33, which receives an input from the Eddy current sensing device 21 through leads 34 and delivers an output signal through leads 35 to the terminals 18.

Figure 2:
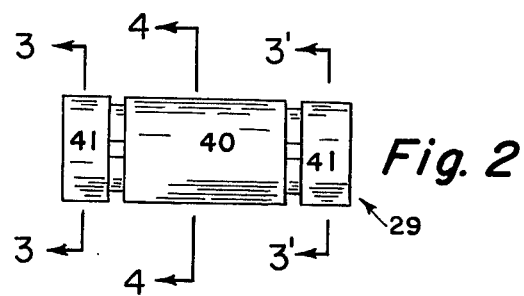
FIG. 2 is a plan view of a torsional spring which can be adapted to the mounting of the nonmagnetic metallic beam.
Figures 3, 4:
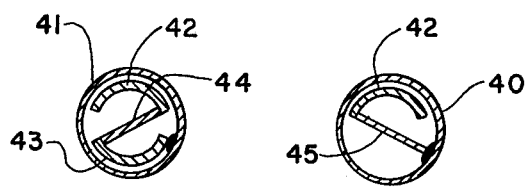
FIGS. 3 and 4 are cross-sectional views taken along the lines 3—3 and 4—4 of FIG. 2.

A typical torsion pivot is illustrated in FIGS. 2, 3 and 4 and includes a central cylindrical sleeve 40, two lateral cylindrical sleeves 41 and interior cylindrical sleeve portions 42, 43. Interior cylindrical sleeve portions 43 are connected to the exterior sleeves 41 by adhesives or welds and further are connected to the interior sleeve portions 42 by means of a strut 44. The interior cylindrical sleeve portion 42 is connected to the central sleeve portion 41 by means of a strut 45.

In operation the torsion pivot 29 is securely mounted with the exterior sleeves 41 in the bracket 27. The interior cylindrical sleeve 40 is free to oscillate about the axis of the torsion pivot 29. The nonmagnetic metallic beam 30 is secured to the central cylinder 40 by adhesives or welding. Thus the nonmagnetic metallic beam 30 is resiliently supported within the chamber 23 and is free to move about the axis of the torsion pivot 29.

While the described torsion pivot is a preferred embodiment of the mounting means, the nonmagnetic metal beam 30 can be otherwise resiliently mounted, e.g., mounted as a cantilever beam.

In operation the device 10 is secured to an object, for example, to the bearing of a shaft which rotates at a low frequency, up to about 200 Hertz. The device 10 oscillates along with the object whose movement is to be measured. The distance between the sensing probe 22 and the end 31 of the beam 30 changes. The instantaneous displacement of the beam tip 31 from the probe tip 22 corresponds with the instantaneous acceleration experienced by the device 10 and hence by the object to be measured.

The Eddy current sensing device 21 includes a coil of fine wire which is a component in the tank circuit of an oscillator contained within the signal conditioner 32. The inductance of the coil of the Eddy current sensing device 21 varies in accordance with the distance between the probe tip 22 and the confronting beam tip 31. Thus the output signal for the signal conditioner 32 varies according to the instantaneous displacement of the beam tip 31. That output signal is applied through the conductors 35 to the terminals 18. One of the terminals 18 is a casing ground conductor; one terminal is a signal ground conductor; the other terminal is a signal conductor.

The nonmagnetic metal beam 30 can be fabricated from aluminum, magnesium, stainless steel, copper, et cetera, although stainless steel is a preferred material. The casing 11 similarly can be fabricated from any suitable material such as aluminum, steel, plastics.

An explanation of the operation of the device is provided wherein:

$x$ represents the instantaneous displacement between the beam tip 31 and the sensing probe 22.

$y$ represents the instantaneous displacement of the device 10 (that is, the displacement of the surface on which the device 10 is mounted).

$\omega$ represents the frequency of the cyclic motion.

$\omega_n$ represents the undamped natural frequency of the nonmagnetic metallic beam 30.

$q$ represents the relative critical damping factor.

Employing these designations, the instantaneous displacement $x$ can be represented by the following formula:

$$x = \frac{\omega^2 y}{\omega_n^2 \left( \left[1 - \left(\frac{\omega}{\omega_n}\right)^2\right]^2 + \left[2q \left(\frac{\omega}{\omega_n}\right)\right]^2 \right)^{1/2}}$$

In the formula, the expression $\omega^2 y$ corresponds to instantaneous acceleration of the device and hence the instantaneous displacement $x$ is directly proportional to the acceleration so long as $\omega$ is less than $\omega_n$ and so long as the damping factor $q$ is about 0.6, preferably 0.5 to 0.7.

A critical damping factor of 0.6 is easily obtained. The present device is sensitive only to motions or components of motion in line with the axis of the Eddy current sensing device 21.

From the formula it will be seen that the device is useful over a frequency range from 0 frequency, i.e., constant acceleration, to a frequency approximately 0.8 times the undamped natural frequency $\omega_n$ of the nonmagnetic metallic beam 30.

Two prototypes of the present device will be described. In both prototypes the nominal gap between the tip 22 of the Eddy current sensing probe and the beam end 31 is maintained at 0.020 inch with a linear ambit of plus-or-minus 0.010 inch.

Prototype I has a spring mounted beam 30 with a natural frequency of 100 Hertz. Prototype II has a spring mounted beam 30 with a natural frequency of 160 Hertz. The sensitivity of prototype I is 385 millivolts per g. The sensitivity of prototype II is 180 millivolts per g. The maximum useful acceleration range for prototype I is up to about 10 g. peak, although the device will withstand higher overloads up to 100 times the peak. The useful range, that is maximum g's, is limited by the linear range of the gap between the sensor tip and the beam end 31.

Figure 6:
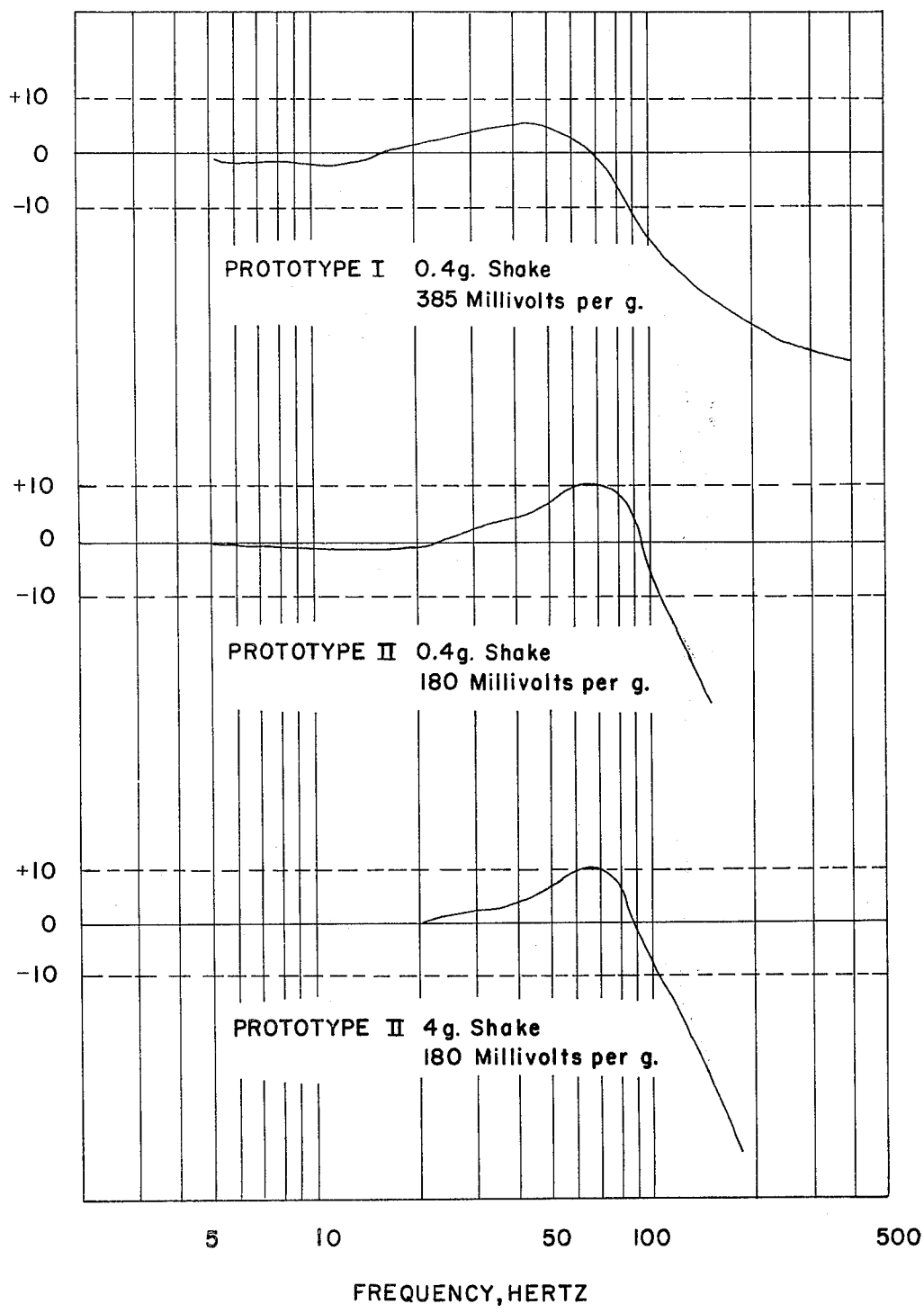
FIG. 6 is a graphical presentation of operating characteristics of two prototypes of the present device.

Prototype I was tested in a testing device over a frequency range at a constant shake of 0.4 g. The sensitivity of the device remained within 10 percent of reference level, 385 millivolts per g., over a range of 5 to 80 Hertz. This is seen in FIG. 6 which is a standard deviation curve showing the deviation on the vertical axis and the frequency on the horizontal axis.

Prototype II was tested similarly at a constant shake of 0.4 g. and again at a constant shake of 4 g. The sensitivity, 180 millivolts per g., was within 10 percent over a range of 5 to 100 Hertz at the 0.4 g. shake and over a range of 20 to 100 Hertz at the 4 g. shake, as seen in FIG. 6.

While this device has been illustrated and described with damping provided by a viscous fluid, other damping may be employed. The use of damping fluids restricts the temperature range of use of the device. The nonmagnetic metallic bar may be damped by squeeze-film devices or with hysteresis resistance to movement.

I claim:

1. A self-contained acceleration measuring device confined within an enclosed housing; a barrier wall dividing the said housing into a first chamber and a second chamber; a nonmagnetic metal beam pivotally mounted at one end on a torsion pivot in the said first chamber and having an unsupported free end; said first chamber being filled with fluid as a damping means for resisting movement of the said beam; an Eddy current type displacement sensing device mounted in said barrier wall with its sensing tip in the said first chamber and having electrical conductors extending into said second chamber; the said free end of the said beam being disposed in confronting relation with the said Eddy current displacement sensing tip in such manner that the instantaneous displacement between the said beam and the said sensing tip corresponds to the instantaneous acceleration applied to the said housing; means within said second chamber for generating an electrical signal directly responsive to the said instantaneous displacement between the said beam and the said sensing tip; and means for converting the said electrical signal directly to an indication of the instantaneous acceleration of the said housing.

\* \* \* \* \*